US009014717B1

(12) United States Patent
Provost et al.

(10) Patent No.: US 9,014,717 B1
(45) Date of Patent: Apr. 21, 2015

(54) METHODS, SYSTEMS, AND MEDIA FOR DETERMINING LOCATION INFORMATION FROM REAL-TIME BID REQUESTS

(71) Applicants: Foster J. Provost, New York, NY (US); Tina Eliassi-Rad, Jersey City, NJ (US); Lauren S. Moores, New York, NY (US)

(72) Inventors: Foster J. Provost, New York, NY (US); Tina Eliassi-Rad, Jersey City, NJ (US); Lauren S. Moores, New York, NY (US)

( * ) Notice: Subject to any disclaimer, the term of this patent is extended or adjusted under 35 U.S.C. 154(b) by 219 days.

(21) Appl. No.: 13/830,495

(22) Filed: Mar. 14, 2013

Related U.S. Application Data

(60) Provisional application No. 61/625,003, filed on Apr. 16, 2012.

(51) Int. Cl.
*H04W 24/00* (2009.01)
*H04W 8/02* (2009.01)
*H04W 8/00* (2009.01)

(52) U.S. Cl.
CPC ............... *H04W 8/02* (2013.01); *H04W 8/005* (2013.01)

(58) Field of Classification Search
CPC .............. G06Q 30/02; G06Q 30/0277; G06Q 30/0241; G06Q 30/0239; G06Q 30/0255; G06Q 30/0261; G06Q 30/0251; G06F 17/30867; H04L 29/12367
USPC ....................... 705/14.64, 14.67, 26.1, 14.49; 455/404.2, 456–457, 517; 709/206
See application file for complete search history.

(56) References Cited

U.S. PATENT DOCUMENTS

| | | | |
|---|---|---|---|
| 4,264,906 A | | 4/1981 | Wakatake |
| 5,431,288 A | | 7/1995 | Nishijima et al. |
| 5,532,753 A | * | 7/1996 | Buchner et al. ................ 725/56 |
| 5,590,250 A | * | 12/1996 | Lamping et al. .............. 345/427 |
| 5,615,325 A | * | 3/1997 | Peden ........................ 715/854 |
| 5,619,632 A | * | 4/1997 | Lamping et al. .............. 345/441 |
| 5,675,510 A | * | 10/1997 | Coffey et al. ................ 709/224 |
| 5,712,981 A | * | 1/1998 | McKee et al. ................ 709/241 |
| 5,910,803 A | * | 6/1999 | Grau et al. ................... 715/734 |
| 6,052,730 A | | 4/2000 | Felciano et al. |
| 6,470,383 B1 | * | 10/2002 | Leshem et al. ............... 709/223 |
| 6,952,181 B2 | * | 10/2005 | Karr et al. ................... 342/457 |
| 7,647,057 B2 | * | 1/2010 | Jamshidi .................... 455/456.3 |
| 7,761,326 B2 | | 7/2010 | Miyaoku et al. |
| 8,001,005 B2 | | 8/2011 | Pitkow et al. |
| 8,073,460 B1 | * | 12/2011 | Scofield et al. ............ 455/456.1 |

(Continued)

OTHER PUBLICATIONS

Office Action for U.S. Appl. No. 14/043,610, mailed Dec. 17, 2013.

(Continued)

*Primary Examiner* — Bunjob Jaroenchonwanit

(57) ABSTRACT

Methods, systems, and media for determining location information from real-time bid requests are provided. In some implementations, a method for determining device locations is provided, the method comprising: receiving a real-time data stream that includes location proxies corresponding to devices; generating a movement graph of interconnected nodes and edges, wherein each node represents one of the location proxies and wherein each edge represents movement information between the location proxies; calculating, for a node in the movement graph, location information by applying a predictive model having weights based on the movement information; and assigning, for the node in the movement graph, a census-based identifier to the calculated location information. The census-based identifier can be used, for example, to supplement or enrich bid requests within the real-time data stream.

21 Claims, 5 Drawing Sheets

(56) References Cited

U.S. PATENT DOCUMENTS

| | | | |
|---|---|---|---|
| 8,370,062 B1* | 2/2013 | Starenky et al. | 701/467 |
| 8,386,304 B2 | 2/2013 | Chen et al. | |
| 8,386,311 B2 | 2/2013 | Park et al. | |
| 8,438,062 B2 | 5/2013 | Rohan et al. | |
| 8,453,190 B2 | 5/2013 | Liwerant et al. | |
| 8,464,302 B1 | 6/2013 | Liwerant et al. | |
| 8,548,851 B2 | 10/2013 | Chen et al. | |
| 8,566,022 B1* | 10/2013 | Starenky et al. | 701/410 |
| 8,577,735 B2 | 11/2013 | Wilen et al. | |
| 8,582,565 B1 | 11/2013 | Morsy et al. | |
| 8,583,368 B1* | 11/2013 | Sindlinger et al. | 701/460 |
| 8,805,348 B2* | 8/2014 | Matsuoka | 455/418 |
| 8,855,922 B1* | 10/2014 | Starenky et al. | 701/410 |
| 2002/0078191 A1 | 6/2002 | Lorenz | |
| 2002/0169892 A1 | 11/2002 | Miyaoku et al. | |
| 2004/0203854 A1* | 10/2004 | Nowak | 455/456.1 |
| 2005/0136949 A1* | 6/2005 | Barnes | 455/461 |
| 2005/0239477 A1* | 10/2005 | Kim et al. | 455/456.1 |
| 2006/0119508 A1* | 6/2006 | Miller | 342/357.17 |
| 2006/0167749 A1 | 7/2006 | Pitkow et al. | |
| 2007/0133571 A1* | 6/2007 | Kahn et al. | 370/400 |
| 2007/0157110 A1 | 7/2007 | Gandhi et al. | |
| 2007/0157113 A1 | 7/2007 | Bishop et al. | |
| 2007/0157114 A1 | 7/2007 | Bishop et al. | |
| 2008/0114649 A1 | 5/2008 | Swirsky et al. | |
| 2008/0172478 A1* | 7/2008 | Kiyohara et al. | 709/220 |
| 2008/0255904 A1 | 10/2008 | Park et al. | |
| 2008/0300983 A1 | 12/2008 | Chen et al. | |
| 2009/0012760 A1* | 1/2009 | Schunemann | 703/6 |
| 2009/0023456 A1* | 1/2009 | Seacat et al. | 455/456.1 |
| 2009/0070706 A1 | 3/2009 | Ranganath et al. | |
| 2009/0254954 A1 | 10/2009 | Jeong | |
| 2009/0327070 A1 | 12/2009 | Etchegoyen | |
| 2010/0017278 A1 | 1/2010 | Wilen et al. | |
| 2010/0057832 A1 | 3/2010 | Tsun et al. | |
| 2010/0246405 A1* | 9/2010 | Potkonjak | 370/241 |
| 2011/0138326 A1 | 6/2011 | Roberts et al. | |
| 2011/0191714 A1 | 8/2011 | Ting et al. | |
| 2011/0246267 A1 | 10/2011 | Williams et al. | |
| 2011/0246297 A1 | 10/2011 | Buchalter et al. | |
| 2011/0246298 A1 | 10/2011 | Williams et al. | |
| 2011/0270673 A1 | 11/2011 | Lin et al. | |
| 2011/0288916 A1 | 11/2011 | Pitkow et al. | |
| 2011/0295680 A1 | 12/2011 | Shaw | |
| 2011/0302025 A1 | 12/2011 | Hsiao et al. | |
| 2011/0307320 A1 | 12/2011 | Tangney et al. | |
| 2011/0307321 A1 | 12/2011 | Tangney et al. | |
| 2011/0307322 A1 | 12/2011 | Hsiao et al. | |
| 2011/0307324 A1 | 12/2011 | Hsiao et al. | |
| 2011/0307325 A1 | 12/2011 | Hsiao et al. | |
| 2011/0307326 A1 | 12/2011 | Hsiao et al. | |
| 2011/0307330 A1 | 12/2011 | Hsiao et al. | |
| 2011/0307509 A1 | 12/2011 | Hsiao et al. | |
| 2011/0307515 A1 | 12/2011 | Chen et al. | |
| 2012/0010927 A1* | 1/2012 | Attenberg et al. | 705/14.4 |
| 2012/0078708 A1 | 3/2012 | Taylor et al. | |
| 2012/0149388 A1* | 6/2012 | West et al. | 455/456.1 |
| 2012/0166272 A1 | 6/2012 | Wiley et al. | |
| 2012/0265599 A1 | 10/2012 | Corner et al. | |
| 2012/0265603 A1 | 10/2012 | Corner et al. | |
| 2012/0275524 A1* | 11/2012 | Lien et al. | 375/240.24 |
| 2012/0302256 A1* | 11/2012 | Pai et al. | 455/456.2 |
| 2012/0303447 A1 | 11/2012 | Hughes et al. | |
| 2012/0310736 A1* | 12/2012 | Vengroff et al. | 705/14.53 |
| 2013/0085841 A1 | 4/2013 | Singleton et al. | |
| 2013/0085868 A1 | 4/2013 | Jordan et al. | |
| 2013/0166376 A1 | 6/2013 | Cohen et al. | |
| 2013/0173358 A1 | 7/2013 | Pinkus | |
| 2013/0173382 A1 | 7/2013 | Hasson et al. | |
| 2013/0203440 A1* | 8/2013 | Bilange et al. | 455/456.2 |
| 2013/0231977 A1 | 9/2013 | Synett et al. | |
| 2014/0032326 A1 | 1/2014 | Li et al. | |
| 2014/0068773 A1* | 3/2014 | Stitelman et al. | 726/24 |
| 2014/0089349 A1* | 3/2014 | Mercier et al. | 707/796 |
| 2014/0095297 A1 | 4/2014 | O'Reilly et al. | |
| 2014/0237595 A1* | 8/2014 | Sridhara et al. | 726/23 |
| 2014/0349671 A1* | 11/2014 | Lakhzouri et al. | 455/456.1 |

OTHER PUBLICATIONS

Office Action for U.S. Appl. No. 14/043,610, mailed Apr. 24, 2014.

\* cited by examiner

METHODS, SYSTEMS, AND MEDIA FOR DETERMINING LOCATION INFORMATION FROM REAL-TIME BID REQUESTS

CROSS-REFERENCE TO RELATED APPLICATIONS

This application claims the benefit of U.S. Provisional Patent Application No. 61/625,003, filed Apr. 16, 2012, which is hereby incorporated by reference herein in its entirety.

TECHNICAL FIELD

The disclosed subject matter relates to methods, systems, and media for determining location information from real-time bid requests.

BACKGROUND

When targeting mobile advertisements to mobile devices (e.g., mobile telephones, smartphones, tablet computers, gaming devices, etc.), having reliable location information for real-time bid requests is an important part of conducting a successful targeting campaign. However, many real-time bid requests do not include fine-grained location information, such as latitude and longitude information. For privacy reasons, sell-side platforms typically do not provide any location information. Even further, due to IP address translation, targeters cannot simply look up fine-grained location of IP addresses in a database. This may be because real-time bidding systems do not possess such location information. This may also be because there are concerns with processing and/or storing fine-grained location information.

Accordingly, it is desirable to provide methods, systems, and media for determining location information from real-time bid requests.

SUMMARY

In accordance with various embodiments of the disclosed subject matter, methods, systems, and media for determining location information for real-time bid requests are provided.

In accordance with some embodiments of the disclosed subject matter, a method for determining device locations is provided, the method comprising: receiving, using a hardware processor, real-time bid requests; determining, from IP addresses associated with the real-time bid requests, mobile IP addresses and non-mobile IP addresses based on a radius parameter; monitoring movement information between the mobile IP addresses and the non-mobile IP addresses; generating a movement graph of interconnected nodes and edges, wherein each node represents one of the mobile IP addresses and the non-mobile IP addresses and wherein each edge represents the movement information between nodes; calculating, for a node in the movement graph, location information by applying a predictive model having weights based on the movement information; assigning, for the node in the movement graph, a census block group information to the calculated location information; and supplementing the real-time bid request corresponding to the node with the census block group information.

In some embodiments, each real-time bid request is associated with a hashed public IP address.

In some embodiments, the movement information includes a movement between a first non-mobile IP address and a second non-mobile IP address. In some embodiments, the movement information includes a movement between a non-mobile IP address and a mobile IP address. In some embodiments, the movement information includes a movement between a first mobile IP address and a second mobile IP address.

In some embodiments, the movement information includes the number of movements between two nodes and the inter-arrival times between two nodes. In some embodiments, the predictive model is a weighted-vote relational neighbor classifier with the number of movements and the inter-arrival times as the weights.

In some embodiments, the calculated location information includes inferring latitude and longitude information for the node without actual location information.

In some embodiments, the census block group is assigned from a plurality of census block groups using a k-nearest neighbor approach. In some embodiments, the census block group is assigned from a plurality of census block groups by: generating a plurality of centroids for each of the plurality of census block groups, wherein a centroid describes the census block group; determining, for a centroid, a distance between the calculated location information and the centroid; comparing the distance with a radius of the census block group corresponding to the centroid; and determining, for the plurality of centroids, a census block group identifier based on the comparison.

In some embodiments, the comparison further comprises a ratio of the distance to the radius of the census block group and the census block group identifier corresponds to the census block group that provided the ratio having a minimum value.

In accordance with some embodiments of the disclosed subject matter, a system for determining device locations is provided, the system comprising: at least one hardware processor that is configured to: receive real-time bid requests; determine, from IP addresses associated with the real-time bid requests, mobile IP addresses and non-mobile IP addresses based on a radius parameter; monitor movement information between the mobile IP addresses and the non-mobile IP addresses; generate a movement graph of interconnected nodes and edges, wherein each node represents one of the mobile IP addresses and the non-mobile IP addresses and wherein each edge represents the movement information between nodes; calculate, for a node in the movement graph, location information by applying a predictive model having weights based on the movement information; assign, for the node in the movement graph, a census block group information to the calculated location information; and supplement the real-time bid request corresponding to the node with the census block group information.

In accordance with some embodiments of the disclosed subject matter, non-transitory computer-readable medium containing computer executable instructions that, when executed by a processor, cause the processor to perform a method for determining device locations is provided, the method comprising: receiving real-time bid requests; determining, from IP addresses associated with the real-time bid requests, mobile IP addresses and non-mobile IP addresses based on a radius parameter; monitoring movement information between the mobile IP addresses and the non-mobile IP addresses; generating a movement graph of interconnected nodes and edges, wherein each node represents one of the mobile IP addresses and the non-mobile IP addresses and wherein each edge represents the movement information between nodes; calculating, for a node in the movement graph, location information by applying a predictive model having weights based on the movement information; assigning, for the node in the movement graph, a census block group information to the calculated location information; and supplementing the real-time bid request corresponding to the node with the census block group information.

In accordance with some embodiments of the disclosed subject matter, a method for determining device locations is provided, the method comprising: receiving, using a hardware processor, a real-time data stream that includes location proxies corresponding to devices; generating a movement graph of interconnected nodes and edges, wherein each node represents one of the location proxies and wherein each edge represents movement information between the location proxies; calculating, for a node in the movement graph, location information by applying a predictive model having weights based on the movement information; and assigning, for the node in the movement graph, a census-based identifier to the calculated location information.

In accordance with some embodiments of the disclosed subject matter, a system for determining device locations is provided, the system comprising: at least one hardware processor that is configured to: receive a real-time data stream that includes location proxies corresponding to devices; generate a movement graph of interconnected nodes and edges, wherein each node represents one of the location proxies and wherein each edge represents movement information between the location proxies; calculate, for a node in the movement graph, location information by applying a predictive model having weights based on the movement information; and assign, for the node in the movement graph, a census-based identifier to the calculated location information.

In accordance with some embodiments of the disclosed subject matter, non-transitory computer-readable medium containing computer executable instructions that, when executed by a processor, cause the processor to perform a method for determining device locations is provided, the method comprising: receiving a real-time data stream that includes location proxies corresponding to devices; generating a movement graph of interconnected nodes and edges, wherein each node represents one of the location proxies and wherein each edge represents movement information between the location proxies; calculating, for a node in the movement graph, location information by applying a predictive model having weights based on the movement information; and assigning, for the node in the movement graph, a census-based identifier to the calculated location information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
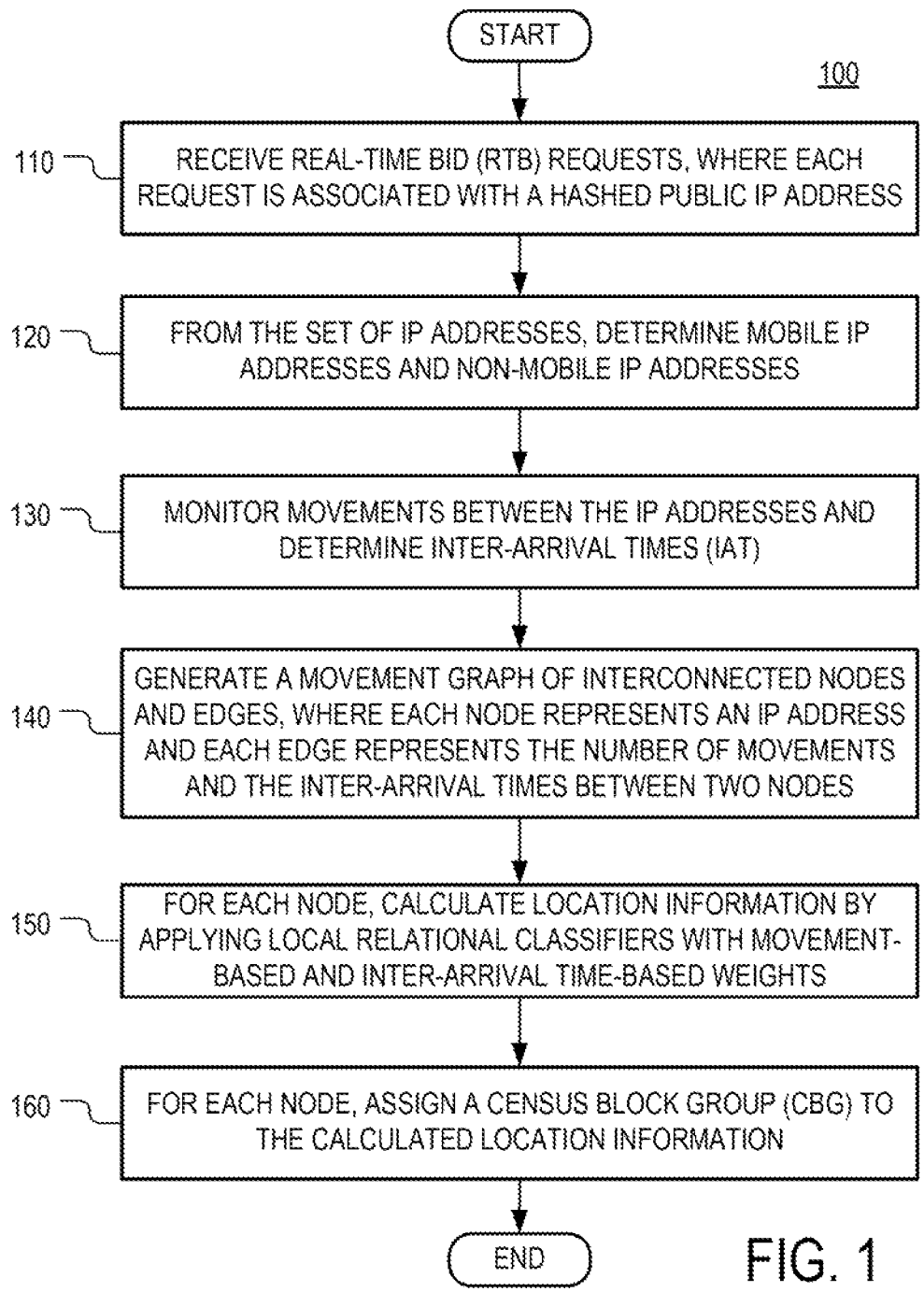
FIG. 1 shows an illustrative example of a process for determining location information from a real-time data stream in accordance with some embodiments of the disclosed subject matter.

In accordance with various embodiments, mechanisms (which include methods, systems, and media) for determining location information from real-time data are provided.

Generally speaking, these mechanisms can determine or infer location information for location proxies obtained from a real-time data stream of information. For example, in some embodiments, the location proxies can be hashed public IP addresses obtained from real-time bid requests. Upon obtaining location proxies from the real-time data stream, fine-grained location information can be inferred or predicted based on the location proxies and another location proxy, such as census block group information, can be assigned to the inferred location information.

These mechanisms can begin by receiving a real-time data stream that includes, for example, real-time bid requests that include hashed public IP addresses. It should be noted that the IP address that can be found when looking up one's computer (e.g., using ipconfig or any other suitable internet protocol configuration application) is not the IP address seen in real-time bidding systems. Instead, an address translation is performed between the two, where hashed public IP addresses are recorded. A public IP address, provided by the Internet Service Provider, is the address that the outside world sees (e.g., a web server sees when accessing its website). Accordingly, each real-time bid request can be associated with a hashed public IP address.

Additionally or alternatively, upon receiving or identifying device information, user information, and/or location information, such information can be anonymized prior to use in the movement network. For example, an irreversible hash function can receive data (e.g., from a real-time data stream) that identifies mobile devices (including a key that identifies a mobile device) and/or location information (including IP addresses or latitude/longitude information corresponding to locations visited by or associated with a mobile device) and irreversibly hash each piece of identification information or location information to a random key. It should be noted that the random anonymized keys generated by the hash function cannot be used to identify a particular location, a particular mobile device, or a particular user. These hashed addresses can be used as location proxies and within the movement network.

In some embodiments, multiple hash functions or non-unique hash functions can be applied. For example, when desiring additional privacy, multiple hash functions can be applied to device identification information and/or location information such that hashing is done irreversibly many-to-one. In this embodiment, with additional applications of these hash functions, the random key may then become increasingly difficult to associate with a particular location, a particular device, or a particular user.

Upon obtaining the hashed public IP addresses or other location proxies, these mechanisms can generate a weighted heterogeneous movement network of interconnected nodes and edges among the location candidates, where the nodes are the hashed public IP addresses as location candidates. It should be noted that, for the nodes in this movement network, mobile IP addresses can be distinguished from non-mobile IP addresses. With regard to the edges of the movement network, the edges can represent movement information between two nodes, such as the number of movements between two nodes and the inter-arrival times for all movements between two nodes.

With this generated movement network, network-inference techniques, such as the use of a weighted-vote relational neighbor classifier or any other suitable predictive model, can be used with movement information-based weights to determine or predict location information (e.g., latitude and longitude information). It should be noted that this can, for example, predict latitude and longitude information for location candidates (e.g., hashed public IP addresses) without receiving location information. The latitude and longitude information that is predicted for each location candidate can then be assigned to another suitable location proxy, such as a census block group that is based on census data. For example, the locations of IP addresses in real-time, mobile bid requests can be inferred at the census block group level.

It should be noted that, although the embodiments described herein relate to using IP addresses and, more particularly, hashed public IP addresses as proxies for location, any suitable identifier from the real-time data stream can be used. For example, hashed device identifiers or hashed network addresses can be used as location proxies.

It should also be noted that, although the embodiments described herein relate to the assignment of a census block group to location information, this is merely illustrative. Any suitable geographical unit or region can be assigned to location information using the mechanisms described herein. Other geographical units or regions can include, for example, census-based units (e.g., a census block, a census tract, a census area, a census district, etc.) and postal codes (e.g., a ZIP code, an extended ZIP+4 code, etc.).

These mechanisms can be used in a variety of applications. For example, by determining a census block group for each location candidate, these mechanisms can obtain location information that is sufficiently fine-grained for advertisement targeting, yet sufficiently coarse-grained to maintain privacy. In another example, these mechanisms can use location information in the form of census block group information to enrich, supplement, or otherwise enhance real-time bid requests prior to transmitting the real-time bid requests to bidders. In yet another example, these mechanisms can use location information in the form of census block group information to extend the audience reach in targeted advertising campaigns with the use of personally identifying information (e.g., associated with mobile devices).

Turning to FIG. 1, an illustrative example of a process 100 for determining location information from a real-time data stream is shown in accordance with some embodiments of the disclosed subject matter. Process 100 can begin by building a movement graph, such as an IP×IP movement graph.

As shown, real-time data, such as real-time bid requests, can be received at 110. For example, real-time bid requests can be sent through a sell-side platform or any other suitable exchange (e.g., using a GET or POST call). As described above, each real-time bid request can be associated with a hashed public IP address.

Although the embodiments described herein generally use a hashed public IP address retrieved from a real-time bid request as a location proxy, any suitable location proxy can be used. For example, information from location-based services that include a device check-in to particular location can be used as a location proxy. In another example, a hashed device identifier can be used as a location proxy.

In some embodiments, at 120, mobile devices can be separated from non-mobile devices. For example, when IP addresses are used as proxies for location, the hashed public IP addresses can be divided between two types of IP addresses—mobile IP addresses and non-mobile IP addresses. Examples of mobile IP addresses can include those with connection types such as 3G, 4G, LTE, etc. Examples of non-mobile IP addresses can include those with connection types, such as broadband, xDSL, cable, etc. The separation of mobile and non-mobile IP addresses is further described in connection with FIG. 2.

Figure 2:
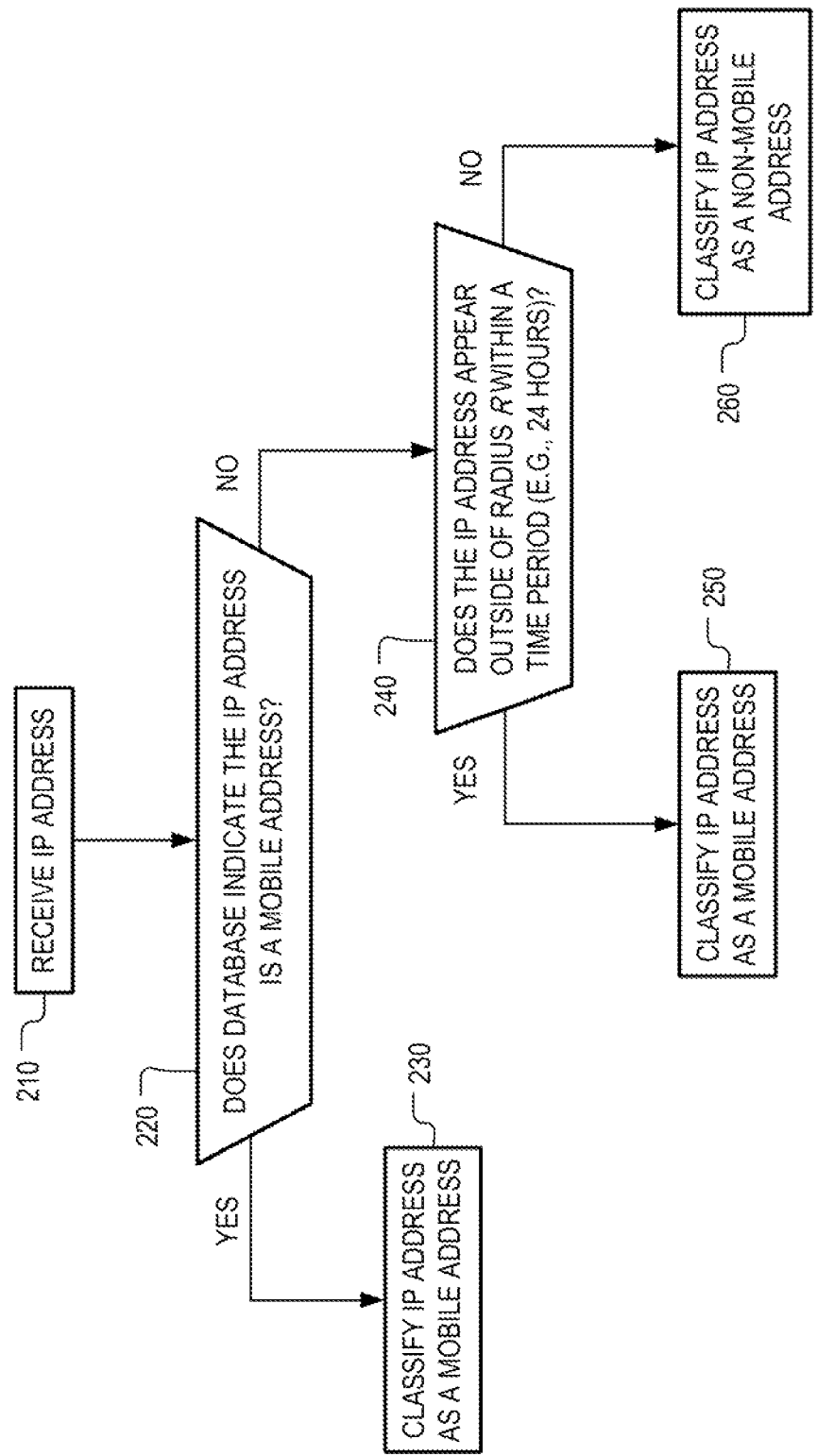
FIG. 2 shows an illustrative example of a process for determining mobile IP addresses and non-mobile IP addresses based on a radius parameter in accordance with some embodiments of the disclosed subject matter.

Turning to FIG. 2, in some embodiments, a database, such as a third-party database or any other suitable storage device, can be used to classify mobile and non-mobile IP addresses. For example, in response to receiving a hashed public IP address at 210, a query can be transmitted to the database to determine whether the database indicates the IP address as a mobile IP address at 220. In response to the database responding to the query with an indication that the IP address is a mobile IP address, the received IP address can be classified as a mobile IP address. Otherwise, process 200 can continue to 240.

In some embodiments, at 240, one or more conditions or rules can be checked. For example, one condition can include determining whether the received IP address appears outside of a radius parameter R within a predetermined period of time. In a more particular example, it can be determined whether the received IP address appears outside of a 100 meter radius based on its current position within a period of 24 hours.

It should be noted that radius parameters and time window parameters can be set using any suitable approach. For example, a radius of 100 meters and a time window of 24 hours can be set as the default parameters. In another example, an administrative user of a bidding system can be provided with an opportunity to set particular radius parameters and particular time window parameters. In yet another example, radius and time window parameters can be based on network device parameters (e.g., the range of a router is less than 100 meters). In a further example, different radius parameters and different time window parameters can be set based on the type of device, the category of targeted advertisement, etc.

In response to the IP address satisfying the radius parameter and the time parameter, the IP address can be classified as a mobile IP address at 250. Alternatively, the IP address can be classified as a non-mobile IP address. The classification as a mobile IP address or a non-mobile IP address can be reflected in the movement graph.

Figure 3:
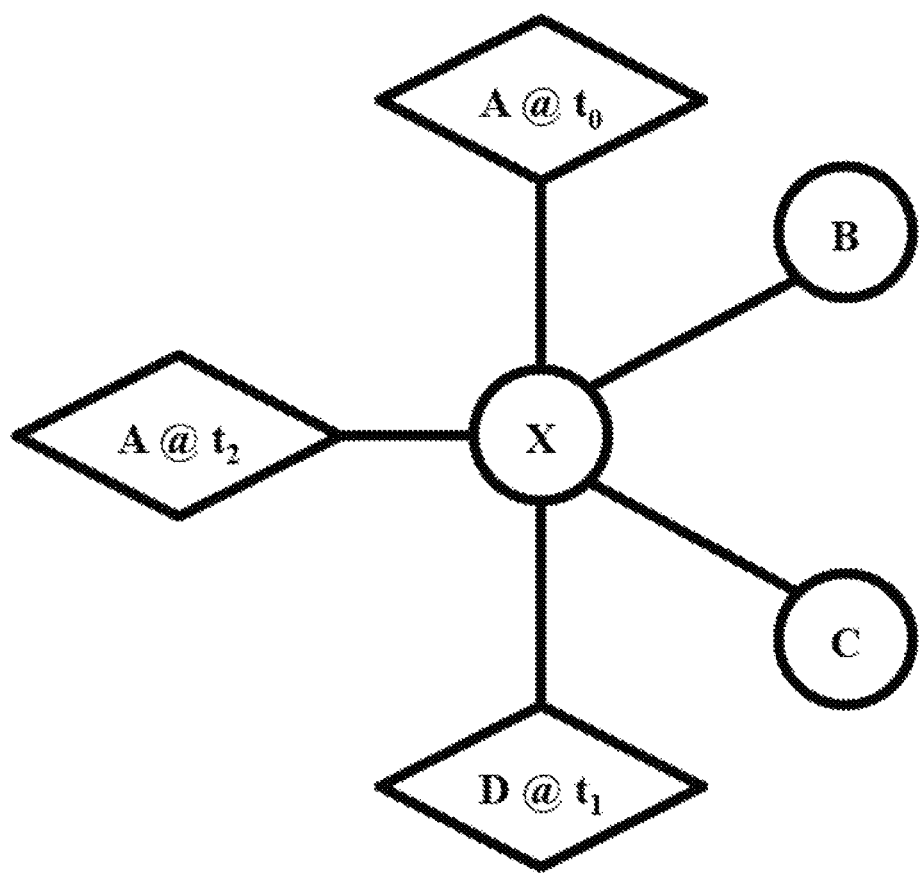
FIG. 3 shows an illustrative example of an IP×IP movement graph in accordance with some embodiments of the disclosed subject matter.

An illustrative example of a movement graph and, more particularly, an IP×IP movement graph is shown in FIG. 3. As shown, non-mobile IP addresses are designated as circle-shaped nodes (e.g., nodes B, C, and X), while mobile IP addresses are designed as diamond-shaped nodes (e.g., nodes A and D). As also shown, mobile IP addresses, such as nodes A and D can be time-stamped as they are transient. It should be noted that the weights on the edges that include the number of movements between two nodes and the inter-arrival times for all movements between two nodes are not shown to avoid overcomplicating the drawing.

Two nodes, $IP_A$ and $IP_B$, can have an edge if the same network exchange identifier (NUID) uses $iP_A$ at time $t_1$ and then uses $IP_B$ at time $t_2$. Because IP addresses are used as proxies for locations, a mobile IP address $IP_A$ at time $t_1$ can be represented by a node $<IP_A, t_1>$ and a non-mobile IP address $IP_B$ at time $t_1$ can be represented by $IP_B$ only. As described above in connection with FIG. 3, this asymmetry is due to mobile IP addresses being more transient than non-mobile IP addresses.

It should be noted that the use of the network exchange identifier (NUID) is merely illustrative. Any other suitable user identifier and/or device identifier can be monitored to determine the particular movements, the number of movements, and/or the inter-arrival times between nodes. These identifiers can include, for example, a media access control (MAC) address, a service set identification (SSID), WiFi information, neighboring access point information, unique device identifiers (UDID), etc.

Referring back to FIG. 1, movement information between location proxies, such as IP addresses, can be monitored at 130. For example, for each edge in the movement graph, the number of movements and the inter-arrival times can be determined between two nodes. As used herein, the number of movements can be the number of times that a network exchange identifier (NUID) is observed using a first hashed mobile IP address (e.g., $IP_A$) and then change to using a second hashed mobile IP address. As also used herein, the inter-arrival time (IAT) of a movement is the time gap between the appearances of a network exchange identifier when it changes from one IP address to another. As there are multiple movements between nodes, distributions of inter-arrival times can be determined. Additionally or alternatively, in some embodiments, a minimum inter-arrival time of all movements on an edge can be used as a small inter-arrival time indicates a smaller distance.

Again, it should be noted that, rather than monitoring a network exchange identifier, any suitable device or user identifier can be used. A device identifier, such as a unique device identifier (UDID) can be monitored to detect the movements between nodes.

Continuing with the example above, the inter-arrival times of the movement of a network exchange identifier from $IP_A$ at time $t_1$ to $IP_B$ at time $t_2$ can be stored on the edge. With regard to movements, suitable movements can include movement between two non-mobile IP addresses, movement between a non-mobile IP address and a mobile IP address, and movement between two mobile IP addresses. It should be noted that, for a movement between two mobile IP addresses, two mobile IP addresses can be represented by a tuple $<IP_A, t_1>$ and $<IP_B, t_2>$, which can be considered a movement if $IP_A$ is different from $IP_B$. It should also be noted there are cases where one network exchange identifier is involved in two consecutive RTB requests from the same hashed mobile IP address. For example, at time $t_1$, a real-time bid request involving $NUID_1$ can be observed at hashed mobile IP address $IP_A$ and the same $NUID_1$ can be observed again in another real-time bid request at time $t_2$ with the same hashed mobile IP address $IP_A$. While this NUID appears as $<IP_A, t_1>$ and $<IP_A, t_2>$, this may not be considered a movement and an edge is not placed between them.

In some embodiments, it should be noted that constraints can be placed on the inter-arrival times for those nodes or hashed public IP addresses having only one neighbor. By, for example, placing such a constraint (e.g., for hashed public IP addresses having only one neighbor, the inter-arrival time is less than or equal to 60 minutes), noisy links can be removed from the movement network.

Referring back to FIG. 1, upon determining the number of movements between nodes and the inter-arrival times between nodes, a movement graph of interconnected nodes and edges can be generated at 140. As shown in FIG. 3, each node represents a hashed public IP address. As described above, each edge can be weighted based on the determined number of movements (numMoves) and/or the determined inter-arrival time (minIAT). Alternatively, other movement information can be used to weight the edges in the movement graph, such as a distribution of inter-arrival times.

At 150, for each node, location information can be determined by applying a predictive model, such as a local relational classifier. One illustrative example of a local relational classifier is a weighted-vote relational neighbor (wvRN) classifier, which performs relational classification via a weighted average of the class membership scores of a node's neighbors. That is, the weighted-vote relational neighbor estimates class membership probabilities using the assumption of homophily (or like attracts like) in the network data. For example, given a node i and a set of neighboring nodes N, the weighted-vote relational neighbor classifier calculates the probability of each class for node i as:

$$P(C_i = c | N) = \frac{1}{L_i} \sum_{j \in N} \begin{cases} w_{i,j} & \text{if } C_i = c \\ 0 & \text{otherwise} \end{cases}$$

where $w_{i,j}$ is the number of links between nodes i and j and $L_i$ is the number of links connecting node i to labeled nodes.

It should be noted that any suitable weight can be used in connection with the predictive model, such as the weighted-vote relational neighbor classifier.

In some embodiments, the number of movements can be used as the weight in the weighted-vote relational neighbor classifier. This is sometimes referred to herein as wvRN(numMoves). Note that a node v is closed in distance to its neighbors with whom it has more movements. Thus, $w_i$ is the number of movements between v and its i-th neighbor.

Additionally or alternatively, the normalized minimum inter-arrival times between two IP addresses can be used as the weight in the weighted-vote relational neighbor classifier. This is sometimes referred to herein as wvRN(minIAT). Note that the longer the inter-arrival time, the longer distance the user has potentially moved (without traffic). For a given node v, the minimum inter-arrival time on all edges of a node v can be denoted with $minIAT_v$. Accordingly, the weight on the movement between node v and its neighbor i can be represented as:

$$w_i = \frac{minIAT_v}{min(t), \forall t \in IAT(v, i)}$$

Given a node v, its neighbors Nbr(v), and the weights on the edges between v and its neighbors (where $w_i$ is the weight on the edge from v to its i-th neighbor), the predicted latitude and longitude values for node v can be represented as:

$$latitude(v) = \frac{\sum_{i \in Nbr(v)} w_i \times latitude(i)}{\sum_{i \in Nbr(v)} w_i}$$

$$\text{longitude}(v) = \frac{\sum_{i \in Nbr(v)} w_i \times \text{longitude}(i)}{\sum_{i \in Nbr(v)} w_i}$$

It should be noted that, although the embodiments described herein generally relate to predicting or inferring latitude and longitude information for a given IP address, this is merely illustrative. Any suitable location information, such as geo-location information, positioning information, etc., can be determined using the mechanisms described herein.

Referring back to FIG. 1, upon determining the predicted latitude and longitude information for a node at 150, a census block group (CBG) can be assigned to the node at 160. Assigned census block groups that are based on census information can be proxies for location information, such as the predicted latitude and longitude information. As used herein, a census block group is a group of census blocks, which are close geographically and do not cross state or county boundaries. For example, the United States (including Puerto Rico) has about 212,000 census block groups, each containing an average of 39 blocks and between 600 and 3,000 people. It should be noted that census block groups can be used, for example, to provide an alternative labeling for IP addresses and incorporate census data, such as user demographic information. Moreover, location information at the census block group level can be sufficient for a targeting campaign for mobile advertisements.

As described above, any suitable geographical unit or region can be assigned to location information using the mechanisms described herein. For example, census-based units (e.g., a census block, a census tract, a census area, a census district, etc.) can be used in place of census block groups. In another example, postal codes (e.g., a ZIP code, an extended ZIP+4 code, etc.) can be used in place of census block groups.

In a more particular example, upon determining the predicted latitude and longitude information (or any other suitable location information) for a node at 160, a census block can be assigned to the node. Assigned census blocks are also based on census information and can be proxies for location information, such as the predicted latitude and longitude information. A census block is the smallest geographic unit based on census information, which are typically bounded by streets, road, and/or creeks. For example, in a city, a census block may correspond to a city block. The United States has over eleven million census blocks. It should be noted that census blocks can be used, for example, to provide an alternative labeling for IP addresses and incorporate census data, such as user demographic information. Moreover, location information at the census block level can be sufficient for a targeting campaign for mobile advertisements.

In some embodiments, instead of moving to a smaller geographic unit, such as a census block, a larger geographic region, such as a census tract, can be assigned to a node. Additionally or alternatively, instead of using census-based geographic units, a ZIP code or a postal code can be assigned to a node.

In some embodiments, a census block group can be assigned to a node based on distance information between a census block group and the predicted location information. For example, census block groups can be assigned using a k-nearest neighbor predictive model. By inputting a node at a location of interest (loc=<lat, lon>), the centroids of the k-nearest census block groups to the inputted location information can be determined. It should be noted that centroid $c_i$ for a census block group I can be represented by $c_i$=<$lat_i$, $lon_i$>, which has an area $a_i$. The distance between the location information and the centroid of the j-th nearest census block group and the radius of the census block group corresponding to the j-th centroid can be determined. A comparison or a ratio of the distance to the radius can be determined and a census block group identifier corresponding to the minimum ratio can be provided. In response, the census block group identifier (CBG ID) can be assigned to the node. For example, the census block group identifier, hashed public IP address, node information, predicted latitude and longitude information, and/or any other suitable information (e.g., timestamp information, sell-side platform user identifiers, client device information, etc.) can be stored in a database or any other suitable storage device for retrieval.

In a more particular embodiment, the process for assigning a census block group can be represented as:

1 C←centroids of the k nearest CBGs to loc
2 For j in C
// distance between loc and the centroid of the j-th nearest CBG
$d_j$←distance(loc, $c_j$)
// radius of CBG corresponding to the j-th centroid $$r_j \leftarrow \sqrt{\left(\frac{a_j}{\pi}\right)}$$

// ratio of distance over radius $$\text{ratio}_j \leftarrow \frac{d_j}{r_j}$$

3 Return the CBG ID corresponding to min($\text{ratio}_j$), $\forall j \in C$

It should be noted, however, that any suitable predictive model can be used to determine the census block group corresponding to the inputted location information.

In some embodiments, in response to obtaining a census block group identifier or any other suitable location proxy for each of the nodes (which represent a hashed public IP address), the real-time bid request and subsequent real-time bid requests associated with each hashed public IP address can be enriched and/or supplemented with the census block group identifier. For example, in response to receiving a real-time bid request and its associated hashed public IP address, the determination of whether a census block group identifier or any other suitable location information can be associated with a particular hashed public IP address can be performed by a table lookup operation. In another example, the census block group identifiers associated with particular hashed public IP addresses can be transmitted to another entity.

Figure 4:
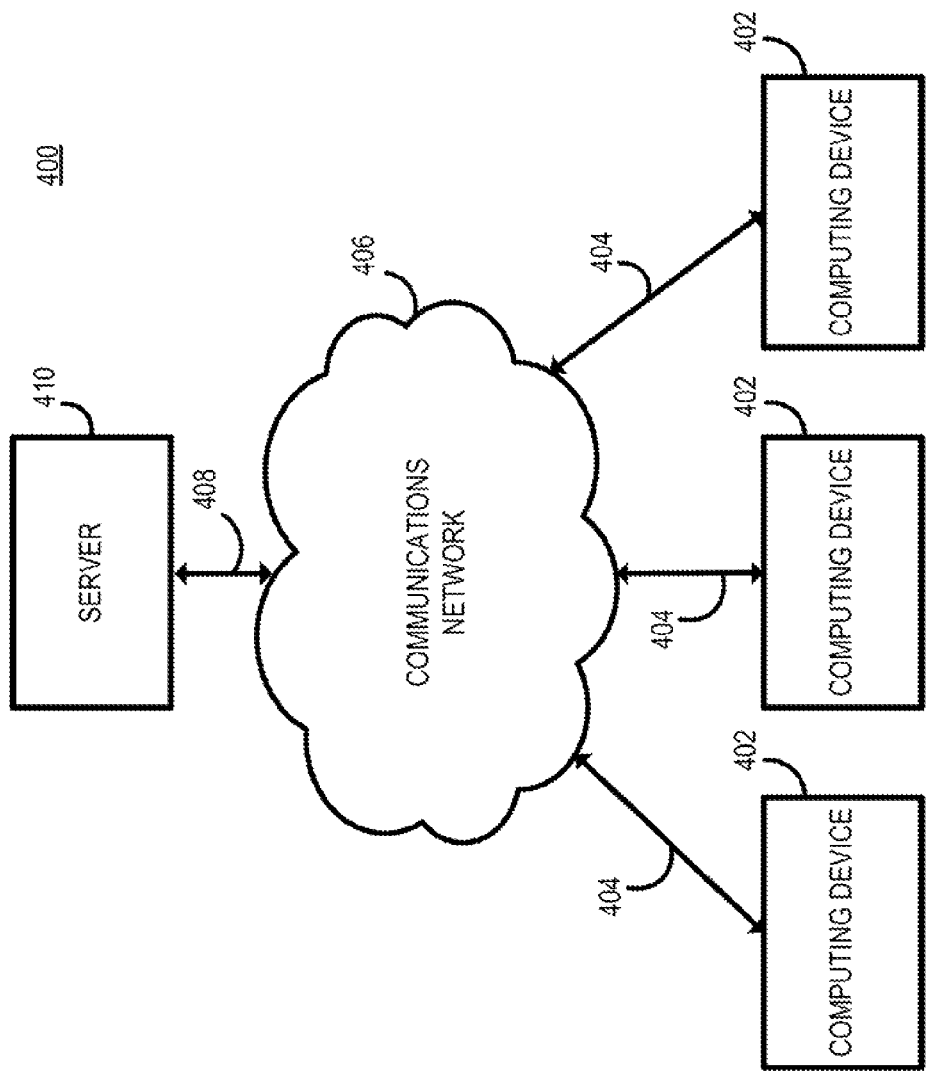
FIG. 4 shows a schematic diagram of an illustrative system suitable for implementation of the mechanisms described herein for determining location information from real-time bid requests in accordance with some embodiments of the disclosed subject matter.

FIG. 4 shows an example 400 of a generalized schematic diagram of a system on which the mechanisms for determining location information from real-time bid requests as described herein can be implemented in accordance with some embodiments. As illustrated, system 400 can include one or more computing devices 402, each of which can be used by one of the devices (e.g., mobile telephones, tablet computing devices, laptop computing devices, desktop computing devices, televisions, portable media players, etc.) shown in the movement network 300 of FIG. 3. Computing devices 402 can be local to each other or remote from each other. Computing devices 402 are connected by one or more communications links 404 to a communications network 406 that is linked via a communications link 408 to a server 410.

System 400 can include one or more servers 410. Server 410 can be any suitable server for determining location information based on real-time bid requests, such as a processor, a computer, a data processing device, or a combination of such devices. For example, the location determination approaches can be distributed into multiple backend components and multiple frontend components or interfaces. In a more particular example, backend components, such as data collection of real-time bid requests and hashed public IP addresses and data distribution can be performed on one or more servers 510. Similarly, the graphical user interfaces displayed by a location determination or real-time bid enhancement application, such as a data interface for providing real-time bid requests or a data interface for providing enhanced real-time bid requests supplemented with census block group information, can be distributed by one or more servers 510 to computing device 502.

More particularly, for example, each of the computing device 402 and server 410 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 402 can be implemented as a personal computer, a tablet computing device, a personal data assistant (PDA), a portable email device, a multimedia terminal, a mobile telephone, a gaming device, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 4, communications network 406 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404, 408 and 414 can be any communications links suitable for communicating data among image capture devices 410, computing devices 412, and server 402, such as network links, dial-up links, wireless links, hard-wired links, any other suitable communications links, or any suitable combination of such links. Computing devices 402 enable a user to access features of the application. Computing devices 402 can be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Computing devices 402 and server 410 can be located at any suitable location. In one embodiment, computing devices 402 and server 410 can be located within an organization. Alternatively, computing devices 402 and server 410 can be distributed between multiple organizations.

Figure 5:
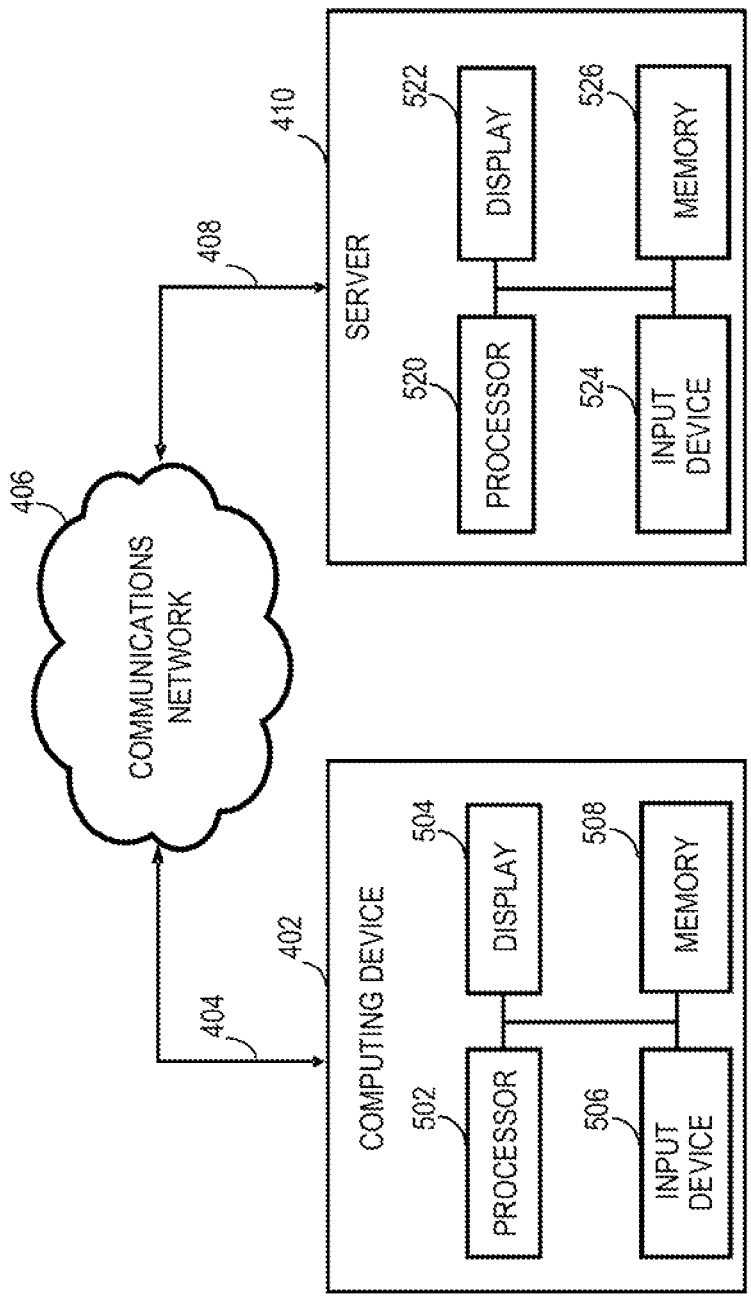
FIG. 5 shows a detailed example of a server and one of the computing devices of FIG. 4 that can be used in accordance with some embodiments of the disclosed subject matter.

FIG. 5 illustrates an example 500 of hardware that can be used to implement server 402 and one of image capture devices 410 depicted in FIG. 4 in accordance with some embodiments of the disclosed subject matter. Referring to FIG. 5, image capture device 410 can include a hardware processor 512, a display 514, an input device 516, and memory 518, which can be interconnected. In some embodiments, memory 518 can include a storage device (such as a non-transitive computer-readable medium) for storing a computer program for controlling hardware processor 512.

Hardware processor 512 can use the computer program to present on display 514 the location information determination approaches and the data received through communications link 404 and commands and values transmitted by a user of computing device 402. It should also be noted that data received through communications link 404 or any other communications links can be received from any suitable source. Input device 506 can be a computer keyboard, a mouse, a cursor-controller, dial, switchbank, lever, or any other suitable input device as would be used by a designer of input systems or process control systems. Alternatively, input device 606 can be a finger or stylus used on a touch screen display 604.

Server 402 can include a hardware processor 522, a display 524, an input device 526, and memory 528, which can be interconnected. In some embodiments, memory 528 can include a storage device for storing data received through communications link 404 or through other links. The storage device can further include a server program for controlling hardware processor 522.

In some embodiments, server 402 can be implemented in one server or can be distributed as any suitable number of servers. For example, multiple servers 402 can be implemented in various locations to increase reliability and/or increase the speed at which the server can communicate with client devices 402. As another example, multiple servers 402 can be implemented for performing various tasks, such as one server (or set of servers) can receive real-time bid requests and hashed public IP addresses, another server (or set of servers) can execute the application for determining and predicting location information (e.g., predicted latitude and longitude information), and yet another server can determine which census block group corresponds to the predicted latitude and longitude information.

In one particular embodiment, the mechanisms described herein can include server-side software, server-side hardware, client-side software, client-side hardware, or any suitable combination thereof. For example, the location determination application can encompass a computer program written in a programming language recognizable by server 402 executing the location determination application (e.g., a program written in a programming language, such as, Java, C, Objective-C, C++, C#, Javascript, Visual Basic, ColdFusion, or any other suitable approaches).

Accordingly, methods, systems, and media for determining location information from real-time bid requests are provided.

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 2 can be executed or performed in any order or sequence not limited to the order and sequence shown and described in the figures. Also, some of the above steps of the processes of FIGS. 1 and 2 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for determining device locations, the method comprising:
   receiving, using a hardware processor, real-time bid requests;
   determining, from IP addresses associated with the real-time bid requests, mobile IP addresses and non-mobile IP addresses based on a radius parameter;
   monitoring movement information between the mobile IP addresses and the non-mobile IP addresses;
   generating a movement graph of interconnected nodes and edges, wherein each node represents one of the mobile IP addresses and the non-mobile IP addresses and wherein each edge represents the movement information between nodes;
   calculating, for a node in the movement graph, location information by applying a predictive model having weights based on the movement information;
   assigning, for the node in the movement graph, a census block group information to the calculated location information; and
   supplementing the real-time bid request corresponding to the node with the census block group information.

2. The method of claim 1, wherein each real-time bid request is associated with a hashed public IP address.

3. The method of claim 1, further comprising anonymizing the IP addresses associated with the real-time bid requests by applying one or more hash functions.

4. The method of claim 1, wherein each of the mobile IP addresses in the movement graph is associated with a time stamp.

5. The method of claim 1, wherein the movement information includes at least one of: movement between a non-mobile IP address and another non-mobile IP address, movement between a mobile IP address and another non-mobile IP address, and movement between the non-mobile IP address and the mobile IP address.

6. The method of claim 1, wherein the movement information includes the number of movements between two nodes and the inter-arrival times between two nodes.

7. The method of claim 6, wherein the predictive model is a weighted-vote relational neighbor classifier with the number of movements and the inter-arrival times as the weights.

8. The method of claim 1, wherein the calculated location information includes inferring latitude and longitude information for the node without actual location information.

9. The method of claim 1, wherein the census block group is assigned from a plurality of census block groups by:
   generating a plurality of centroids for each of the plurality of census block groups, wherein a centroid describes the census block group;
   determining, for a centroid, a distance between the calculated location information and the centroid;
   comparing the distance with a radius of the census block group corresponding to the centroid; and
   determining, for the plurality of centroids, a census block group identifier based on the comparison.

10. The method of claim 9, wherein the comparison further comprises a ratio of the distance to the radius of the census block group and wherein the census block group identifier corresponds to the census block group that provided the ratio having a minimum value.

11. A system for determining device locations, the system comprising:
   at least one hardware processor that is configured to:
      receive real-time bid requests;
      determine, from IP addresses associated with the real-time bid requests, mobile IP addresses and non-mobile IP addresses based on a radius parameter;
      monitor movement information between the mobile IP addresses and the non-mobile IP addresses;
      generate a movement graph of interconnected nodes and edges, wherein each node represents one of the mobile IP addresses and the non-mobile LP addresses and wherein each edge represents the movement information between nodes;
      calculate, for a node in the movement graph, location information by applying a predictive model having weights based on the movement information;
      assign, for the node in the movement graph, a census block group information to the calculated location information; and
      supplement the real-time bid request corresponding to the node with the census block group information.

12. The system of claim 11, wherein each real-time bid request is associated with a hashed public IP address.

13. The system of claim 11, further comprising anonymizing the IP addresses associated with the real-time bid requests by applying one or more hash functions.

14. The system of claim 11, wherein each of the mobile IP addresses in the movement graph is associated with a time stamp.

15. The system of claim 11, wherein the movement information includes a movement between a first non-mobile IP address and a second non-mobile IP address.

16. The system of claim 11, wherein the movement information includes the number of movements between two nodes and the inter-arrival times between two nodes.

17. The system of claim 16, wherein the predictive model is a weighted-vote relational neighbor classifier with the number of movements and the inter-arrival times as the weights.

18. The system of claim 11, wherein the calculated location information includes inferring latitude and longitude information for the node without actual location information.

19. The system of claim 11, wherein the processor is further configured to:
generating a plurality of centroids for each of the plurality of census block groups, wherein a centroid describes the census block group;
determining, for a centroid, a distance between the calculated location information and the centroid;
comparing the distance with a radius of the census block group corresponding to the centroid; and
determining, for the plurality of centroids, a census block group identifier based on the comparison.

20. The system of claim 19, wherein the processor is further configured to:
determine a ratio of the distance to the radius of the census block group; and
determine the census block group identifier corresponding to the census block group that provided the ratio having a minimum value.

21. A method for determining device locations, the method comprising:
receiving, using a hardware processor, a real-time data stream that includes location proxies corresponding to devices;
generating a movement graph of interconnected nodes and edges, wherein each node represents one of the location proxies and wherein each edge represents movement information between the location proxies;
calculating, for a node in the movement graph, location information by applying a predictive model having weights based on the movement information; and
assigning, for the node in the movement graph, a census-based identifier to the calculated location information.

* * * * *